(12) United States Patent
Ayres

(10) Patent No.: US 6,855,393 B1
(45) Date of Patent: Feb. 15, 2005

(54) FIRE BARRIER PANEL

(75) Inventor: Colin James Ayres, Bayswater (AU)

(73) Assignee: Ashmere Holdings Pty Ltd. (AU)

( * ) Notice: Subject to any disclaimer, the term of this patent is extended or adjusted under 35 U.S.C. 154(b) by 0 days.

(21) Appl. No.: 10/311,460

(22) PCT Filed: Jun. 16, 2000

(86) PCT No.: PCT/AU00/00674

§ 371 (c)(1),
(2), (4) Date: May 8, 2003

(87) PCT Pub. No.: WO00/78547

PCT Pub. Date: Dec. 28, 2000

(30) Foreign Application Priority Data

Jun. 17, 2000 (AU) .............................................. PQ1007

(51) Int. Cl.[7] ................................................ B32B 3/12
(52) U.S. Cl. ........................ 428/116; 428/73; 428/920; 428/923; 156/306.9; 156/307.7
(58) Field of Search .......................... 428/116–118, 73, 428/593, 920, 923; 156/60, 290, 291, 306.6, 306.9, 307.7

(56) References Cited

U.S. PATENT DOCUMENTS

| | | | |
|---|---|---|---|
| 4,299,872 A | * 11/1981 | Miguel et al. | ............... 428/117 |
| 4,530,877 A | 7/1985 | Hadley | .................... 428/305.5 |
| 4,973,506 A | * 11/1990 | Bauer et al. | ................... 428/73 |

FOREIGN PATENT DOCUMENTS

| | | |
|---|---|---|
| AU | 19576/76 A | 5/1978 |
| JP | 56-164059 A | 12/1981 |
| JP | 3-206237 A | 9/1991 |
| WO | WO 96/24489 | 8/1996 |

OTHER PUBLICATIONS

International Search Report Dated Aug. 18, 2000.

* cited by examiner

Primary Examiner—Stephen Stein
(74) Attorney, Agent, or Firm—Ostrolenk, Faber, Gerb & Soffen, LLP

(57) ABSTRACT

A fire barrier panel of the kind suitable for lining car decks and engine rooms of high speed aluminum ferries is described. The panel (10) includes a relatively thin layer of inorganic insulating material (12) adhered to a lightweight support structure (14). The layer of inorganic insulating material may be an intumescent material made from mineral fibers. The decribed lightweight support structure (14) is a honeycomb panel having a honeycomb core (18) of non-combustible aluminum foil provided with two face skins made of glass reinforced plastics resin material (16). This construction of the honeycomb panel (14) is lightweight and has high stiffness and rigidity suitable for stiffening and supporting the insulating material into a rigid panel. The layer of intumescent material (12) supported on the panel expands when exposed to high temperatures to form a thick fire insulating barrier panel. Because the panels are self-supporting, and therefore support structures, installation costs are much lower than for prior art fire insulation systems.

24 Claims, 1 Drawing Sheet

FIRE BARRIER PANEL

This is a 371 application of PCT/AU00/00674 filed Jun. 16, 2000 which claims priority to Australian application PQ1007 filed Jun. 17, 1999.

FIELD OF THE INVENTION

The present invention relates to a fire barrier panel for protecting a structure from the effects of fire and relates particularly, though not exclusively, to a fire barrier panel suitable for lining the car decks and engine rooms of high speed aluminium ferries.

BACKGROUND TO THE INVENTION

High speed ferries built in aluminium or composite materials are setting new standards in speed and comfort for water craft. The design of fast ferries requires minimisation of weight wherever possible without compromising structural strength and integrity. Because aluminium is a lightweight metal it is used extensively in the construction of the hulls and decks of fast ferries. However aluminium loses considerable strength above 250° C. and therefore it is essential to minimise the exposure of aluminium structures to high temperatures. For this reason many of the internal exposed surfaces of the hull and decks of the ship are covered with layers of fire protecting insulation.

Existing insulating materials used to line the car decks, cargo decks and engine rooms of aluminium fast ferries are typically glass wool, mineral wool or ceramic fibre blankets faced and supported by galvanised or stainless steel sheets and frames. There are a number of problems with existing insulation systems. Firstly, they are relatively heavy (the lightest are approximately 5 kg/m$^2$, for ceramic fibre systems) and therefore reduce the speed and overall payload of the vessel and/or increase fuel consumption. They are more susceptible to damage due to lack of stiffness and they require a large amount of support structure due to small panel size (typically 1 m$^2$) which makes them expensive to install and further adds weight to the vessel. Finally there ar health and safety question marks over the use of certain types of fibre blankets.

SUMMARY OF THE INVENTION

The present invention was developed with a view to providing an improved fire barrier panel that is self-supporting and light-weight.

Throughout this specification the term "comprising" is used inclusively, in the sense that there may be other features and/or steps included in the invention not expressly defined or comprehended in the features or steps specifically defined or described. What such other features and/or steps may include will be apparent from the specification read as a whole.

According to one aspect of the present invention there is provided a self-supporting fire barrier panel, the panel comprising:

a layer of inorganic insulating material;
a lightweight support structure adhered to a first side of said layer of insulating material so as to stiffen and support the insulating material into a rigid panel; and
an outer layer formed on a second opposite side of the layer of insulating material to restrict erosion of the layer of insulating material;
the lightweight support structure comprising a honeycomb panel having at least one face skin made of a suitably rigid material;
whereby, in use, the insulating material supported on the panel can withstand high temperatures.

Preferably, the insulating material is an intumescent material which expands when exposed to high temperatures.

Typically in its pre-expanded condition said layer of intumescent material is between 3 mm to 12 mm thick, more typically between 6 mm and 10 mm thick. Preferably said intumescent material is a felt material made by rolling and pressing, or by weaving and shrinking, fibres of an inorganic material into a mat or layer. Preferably said intumescent felt material is made from mineral fibres. Preferably said intumescent material is a mixture of thermally activated exfoliating graphite and mineral fibre. Preferably the intumescent material has an expansion ratio of between 2:1 to 18:1, more typically between 6:1 to 9:1.

In one embodiment said outer layer is formed by a suitable additive to the intumescent layer, which chemically fuses when exposed to high temperatures, such as may be present during a fire. In an alternative embodiment said outer layer is formed by a separate layer of suitable fire-resistant material which is laminated to the exposed surface of the intumescent material. This separate layer also servos as a decorative facing. Preferably said layer of intumescent material includes an additive which hardens the exposed surface of the intumescent material in its expanded condition to protect the layer of intumescent material from being dislodged from the panel.

According to another aspect of the present invention, there is provided a self-supporting fire barrier panel, the panel comprising:

a relatively thin layer of inorganic intumescent material adhered to a lightweight support structure for stiffening and supporting the intumescent material into a rigid panel and, wherein the lightweight support structure comprises a honeycomb panel having at least one face skin made of a suitably rigid material, and in its pre-expanded condition said layer of intumescent material is between 6 mm and 10 mm thick in use whereby, the intumescent material supported on the panel expands when exposed to high temperatures to form a thick fire insulating barrier panel.

Preferably the honeycomb panel has a honeycomb core of non-combustible aluminium foil and is provided with two face skins comprised of plastics resin reinforced by glass fibre. Preferably said insulating material is laminated to one side of the honeycomb panel. Advantageously said insulating material is adhered to the honeycomb panel by said plastics resin.

Typically the total thickness of the fire barrier panel is between 10 mm to 25 mm, more typically between 15 mm to 20 mm. The fire barrier panels are typically produced in 3 m$^2$ panels.

Typically the total weight of the fire barrier panel is between 3.0 to 4.0 kg/m$^2$, more typically about 3.5 kg/m$^2$.

According to a still further aspect of the present invention there is provided a method of manufacturing a self-supporting fire barrier panel, the method comprising the steps of:

providing a relatively thin layer of inorganic insulating material;
providing a lightweight support structure comprising a honeycomb panel having face skins made of a suitably rigid material; and
adhering the lightweight support structure to a first side of said layer of inorganic insulating material so as to stiffen and support the insulating material into a rigid panel;

adhering an outer layer to a second opposite side of said layer of insulating material;

whereby, in use, the intumescent material supported on the panel can withstand high temperatures to form a fire insulating barrier panel.

Preferably, the insulating layer is an intumescent material which expands when exposed to high temperatures.

Preferably a honeycomb panel is provided having a honeycomb core of non-combustible aluminium foil with face skins comprised of plastics resin reinforced by glass fibre.

Preferably said step of adhering the layer of intumescent material comprises curing the plastics resin in a press at an elevated temperature below the temperature at which the intumescent layer expands, while co-bonding to the aluminium honeycomb and intumescent material. It is only necessary to apply heat to one side of the panel, opposite to that on which the intumescent layer is provided, as the heat is conducted to the plastics resin immediately adjacent the intumescent layer via the aluminium honeycomb.

BRIEF DESCRIPTION OF THE DRAWINGS

In order to facilitate a more detailed understanding of the nature of the invention a preferred embodiment of the fire barrier panel and method of manufacturing same will now; be described in detail, by way of example only, with reference to the accompanying drawings in which.

DETAILED DESCRIPTION OP PREFERRED EMBODIMENTS

Figure 1:
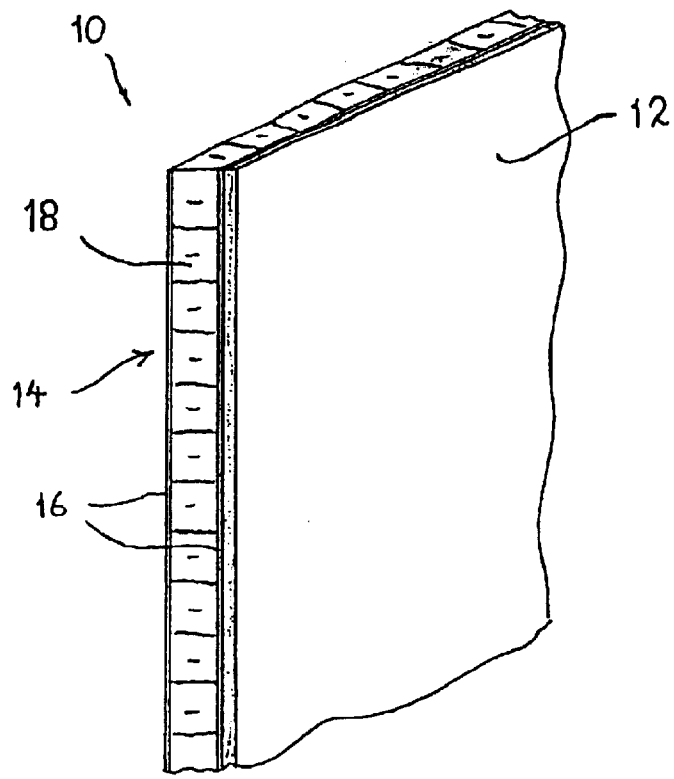
FIG. 1 is a perspective view illustrating the composite structure of a preferred embodiment of the fire barrier panel; and, FIG. 2 illustrates the panel of FIG. 1 with its intumescent layer in an expanded condition.

A preferred embodiment of the fire barrier panel 10 of this invention as illustrated in FIG. 1 comprises a relatively thin layer 12 of an inorganic intumescent material. In this embodiment the intumescent material 12 is a mixture of thermally activated exfoliating graphite and mineral fibres with an acrylic binder that forms a felt layer. In excessive temperature conditions (>190° C.) the graphite expands considerably in volume to produce a thick insulating layer of mineral fibres. A suitable intumescent material is the Tecnofire.

Intumescents manufactured by Technical Fibre Products Limited and sold under the trade mark Tecnofire. Tecnofire mats are sold in a range of densities with various expansion volume and pressure characteristics.

In an alternative embodiment the intumescent material 12 is an expanding felt formed from a mixture of alkaline earth silicate fibres together with a small quantity of organic binder and a special additive which produces an immediate expansion in thickness on exposure to heat. A suitable material is the Firemaster Expanding felt manufactured by Thermal Ceramics and sold under the trade mark Firemaster. This type of intumescent material is typically used for construction joint sealing and penetration seals to provide assured fire protection through expanding joints.

The preferred intumescent material has an expansion ratio of between 2:1 to 18:1, but more typically between 6:1 to 9:1. The intumescent material itself is flimsy, easily damaged and has no inherent mechanical strength. The present invention resides principally in the combination of a layer of the intumescent material with a support structure that is capable of stiffening and supporting the intumescent material with minimal extra weight, and which is able to conform to relevant fire standards.

During tests in situ, it has been found that some of the layer of intumescent material in its expanded condition may be blown away or dislodged from the panel by turbulent air currents, or by high pressure water jets from an automatic fire sprinkler system spraying directly onto the fire barrier panel. Those areas of the support panel which may thereby become exposed to the heat of the fire are no longer insulated and would fail to protect the underlying structure under high temperature conditions. It is therefore desirable to provide some form of hardening within or at the surface of the intumescent material to protect the expanded insulating layer from breaking up and being dislodged from the panel. The hardening thereby enhances the structural integrity of the expanded insulating layer. In one embodiment the intumescent layer is hardened by adding a suitable additive to the intumescent material which chemically fuses when exposed to high temperatures, such as may be present during a fire. In an alternative embodiment the hardened outer layer is formed by the addition of a separate layer of suitable fire resistant material which is laminated to the exposed surface of the intumescent material. This separate layer may also serve as a decorative facing.

The layer of intumescent material 12 is adhered to a lightweight support structure 14 which acts to stiffen and support the intumescent material into a rigid panel 10. In this embodiment the lightweight support structure 14 comprises a honeycomb panel faced on both sides with a skin made of a glass reinforced plastics resin material 16. The honeycomb panel has a honeycomb core 18 of non-combustible aluminium foil arranged in a single layer of hexagonal cells, the cavity of each cell being filled with air. The aluminium honeycomb is Commercial Grade 3000-series alloy, ¼" cell, 3.4 lb/ft$^3$ density, perforated and anticorrosion treated. In principle any grade of aluminium honeycomb would be useable, but other alloys are too expensive and higher densities are also more expensive and unnecessarily heavier. In this embodiment the honeycomb core is approximately 12 mm thick and the face skins are each approximately 0.25 mm thick. Preferably the face skins are comprised of fire retarded plastics resin reinforced by glass fibre. This construction of the honeycomb panel is lightweight and has high stiffness and rigidity. This allows the panels to be made quite large to cover large surface areas of the walls and ceilings. Typically the fire barriers 10 are produced in 3 m$^2$ panels, although even larger panels can be made.

The layer of intumescent material 12 is laminated to one side of the honeycomb panel directly onto one of the face skins 16. In this embodiment the face skins on both sides of the panel are formed by a layer of epoxy-impregnated glass fibre which is cured in a press at high temperature (120° C.) while co-bonding to the aluminium honeycomb and the intumescent felt material. The intumescent material is adhered to one side of the panel by means of the epoxy resin. Heat need be applied to one side of the palm; only. The heat for curing the resin forming the skin directly behind the intumescent layer is conducted via the aluminium honeycomb. Clearly., it cannot be efficiently conducted through the thermal insulation provided by the intumescent layer itself.

The glass fibre currently used is plain woven e-glass having a weight of 300 g/m$^2$, providing a suitable balance of weight, strength and cost. Higher weights add unnecessarily to the weight of the panel and are usually more costly. On the other hand, lower weights may not be strong enough and are not necessary cheaper. The weight of the glass fibre should preferably fall within the range of approximately 300 g/m² to 400 g/m². The weave style of the glass fibre is not critical, but other styles are more costly. Other types of glass are also usually too costly. The epoxy resin was chosen for its bond performance to the different materials, and its ability to continue to hold together the various layers of the laminate, albeit with less strength, during exposure to high temperatures.

The discovery that sufficient heat for curing the epoxy resin skin adjacent to the intumescent layer can be conducted through the aluminium honeycomb to the other side of the panel, in order to adhere the said intumescent layer to the panel, is particularly advantageous. Firstly, it means that the intumescent insulating layer can be adhered to the panel at the same time as the lightweight structure itself is formed in a single process step. Secondly, it avoids the need to use any other adhesive for adhering the intumescent material to the panel. Suitable fire-retardant adhesives with the necessary thermal and chemical properties are expensive and would further add to the overall weight of the fire barrier panel. Thirdly, it provides the structural integrity of the honeycomb sandwich panel supporting the intumescent layer. Finally, it lends itself to either a batch or continuous manufacturing process using a platen or belt press respectively.

Typically the layer of intumescent material 12 is between 3 mm to 12 mm thick in its unexpanded condition. More typically the layer 12 is between 6 mm to 10 mm thick, and in this embodiment the layer is 8 mm thick. Hence, the total thickness of the fire barrier panel 10 of this embodiment is approximately 20 mm. Typically, the total thickness of the fire barrier panel is between 10 mm to 25 mm, and more typically between 15 mm to 20 mm. The total weight of the fire barrier panel is typically between 3.0 to 4.0 kg/m², and more typically about 3.5 kg/m².

The combination of the intumescent layer with the lightweight support structure enables the described fire barrier panel 10 to meet the relevant fire safety standards. In particular, the fire barrier panel 10 is capable of withstanding a temperature of 960° C. after 60 minutes before the temperature of the underlying aluminium structure becomes excessive. Above 250° C. aluminium starts to lose considerable mechanical strength and consequently the structural integrity of the vessel can be compromised. Hence the fire barrier panel will ensure that the vessel will remain afloat for at least one hour to permit evacuation and/or extinguishment of a fire.

Figure 2:
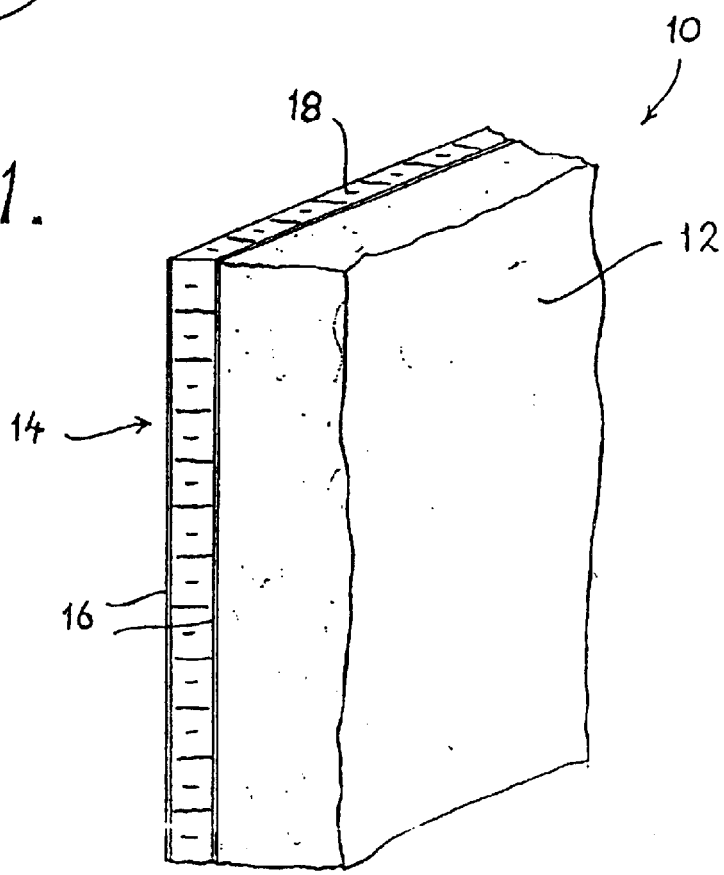

In use, the fire barrier panels 10 are fixed to the walls and ceiling of car decks, cargo holds, engine rooms and other vulnerable surface areas of the aluminium structure of the vessel using a steel support structure in conventional manner. Because the panels 10 are self-supporting, significantly less additional support structure needs to be installed to support or hold the panels in position. Furthermore, large surface areas can be covered with a minimum of effort because the panels can be produced in quite large dimensions. The panels are installed with the intumescent layer 12 facing the potential fire hazard. In the event that the panels 10 are exposed to fire or another high temperature source, the intumescent layer will expand to up to approximately nine (9) times its original thickness forming a thick insulating layer and fire barrier, as shown in FIG. 2, which protects the underlying aluminium structure from excessive heat.

If desired, the exposed face of the fire barrier panel may be covered with a decorative coating. Preferably, a lightweight fire retarded aluminium foil or PVC/PVF sheet coating can be applied to the exposed face of the panel. Alternatively a water-based fire retarded paint coating may be applied to the exposed face. In either case, the decorative coating is intended to provide an attractive, light finish to the panel which helps to brighten up the interior of the car decks or engine room of the ferry. The same coating may perform the dual function of the previously described hardened outer layer to enhance the structural integrity of the insulating layer. The aluminium sheet coating also provides for greater robustness in service against impacts from cars, luggage, people, etc.

The use of an inorganic intumescent material to form an insulating layer is preferred, in view of the superior insulating properties of the intumescent material in its expanded condition. However, other suitable inorganic insulating materials may also be employed in connection with the lightweight support structure. For example, a relatively thin layer of phenolic foam, may be adhered to a honeycomb panel to produce a fire insulating barrier panel. Alternatively, instead of using a honeycomb panel, glass fibre "velvet" impregnated with phenolic resin can be used as the support structure.

From the above description of preferred embodiments of the fire barrier panel 10 of the invention, it will be apparent that the fire barrier panel has a number of advantages over prior insulation systems, including the following:
(i) the panels are lightweight;
(ii) the panels have high strength and stiffness and therefore can be produced and fitted in large panel sizes;
(iii) the panels are self-supporting and therefore require significantly less additional support structures;
(iv) installation costs are much lower than for prior art systems for the reasons noted in (i) to (iii) above;
(v) the panels do not employ any sheet metal, and therefore do not buckle, distort or move when subject to heating in the way that panels formed with sheet metal do; and,
(vi) although the layer of intumescent material is relatively thin, it expands to more than six (6) times its thickness when exposed to high temperatures, and thereby still provides an effective insulating barrier,
(vii) the panels have good acoustic properties and may also be used as fire-safe lightweight acoustic panels.

It will be apparent to persons skilled in the manufacturing arts that numerous variations and modifications can be made to the described fire barrier panel, in addition to those already described, without departing from the basic inventive concepts. For example, the lightweight support structure may have a different construction altogether, for example, a phenolic foam core material with noncombustible steel sheet face skins. The described construction is preferred because of its inherent strength to weight characteristics and fire performance. Furthermore, although the preferred embodiment of the fire barrier panel has been described with particular reference to aluminium fast ferries, it has wider application for protecting and/or insulating other structures including off-shore platforms, aircraft, trains and building constructions. All such variations and modifications are to be considered within the scope of the present invention, the nature of which is to be determined from the foregoing description and the appended claims.

What is claimed is:

1. A self-supporting fire barrier panel, the panel comprising:
    a layer of inorganic insulating material;
    a lightweight support structure adhered to a first side of said layer of insulating material so as to stiffen and support the insulating material into a rigid panel; and an outer layer formed on a second opposite side of the layer of insulating material to restrict erosion of the layer of insulating material;

the lightweight support structure comprising a honeycomb panel having at least one face skin made of a suitably rigid material;

whereby, in use, the insulating material supported on the panel can withstand high temperatures.

2. A self-supporting fire barrier panel as defined in claim 1, wherein said insulating material in an intumescent material which expands when exposed to high temperatures.

3. A self-supporting fire barrier panel as defined in claim 2, wherein in its pre-expanded condition said layer of intumescent material is in a range between approximately 3 mm to 12 mm thick.

4. A self-supporting fire barrier panel as defined in claim 3, wherein in its pre-expanded condition said layer of intumescent material is in a range between approximately 6 mm to 10 mm thick.

5. A self-supporting fire barrier panel as defined in claim 2, wherein said intumescent material is a felt material made by rolling and pressing, or by weaving and shrinking, fibers of an inorganic material into a mat or layer.

6. A self-supporting fire barrier panel as defined in claim 5, wherein said intumescent felt material is made from mineral fibers.

7. A self-supporting fire barrier panel as defined in claim 6, wherein said material is a mixture of thermally activated exfoliating graphite and mineral fiber.

8. A self-supporting fire barrier panel as defined in claim 2, wherein the intumescent material has an expansion ratio in the range between approximately 2:1 to 18:1.

9. A self-supporting fire barrier panel as defined in claim 8, wherein the material has an expansion ratio in the range between approximately 6:1 to 9:1.

10. A self-supporting fire barrier panel as defined in claim 9, wherein said outer layer is formed by a suitable additive to the insulating layer which chemically fuses when exposed to high temperatures, such as may be present during a fire.

11. A self-supporting fire barrier panel as defined in claim 9, wherein said outer layer is formed by a separate layer of suitable fire-resistant material which is laminated to the exposed surface of the insulating material.

12. A self-supporting fire barrier panel as defined in claim 2, wherein said layer of intumescent material includes an additive which hardens the exposed surface of the intumescent material in its expanded condition to protect the layer of intumescent material from being dislodged from the panel.

13. A self-supporting fire barrier panel as defined in claim 1, wherein the honeycomb panel has a honeycomb core of non-combustible aluminum foil and is provided with two face skins comprised of plastics resin reinforced by glass fiber.

14. A self-supporting fire barrier panel as defined in claim 13, wherein said insulating material is laminated to one side of the honeycomb panel.

15. A self-supporting fire barrier panel as defined in claim 14, wherein said insulating material is adhered to the honeycomb panel by said plastics resin.

16. A self-supporting fire barrier panel as defined in claim 1, wherein the total thickness of the fire barrier panel is in a range between approximately 8 mm to 20 mm.

17. A self-supporting fire barrier panel as defined in claim 16, wherein the total thickness of the fire barrier panel is in a range between approximately 10 mm to 15 mm.

18. A self-supporting fire barrier panel as defined in claim 17, wherein the total weight of the fire barrier panel is in a range between approximately 3.0 to 4.0 kg/m$^2$.

19. A self-supporting fire barrier panel, the panel comprising:

a relatively thin layer of inorganic intumescent material adhered to a lightweight support structure for stiffening and supporting the intumescent material into a rigid panel and, wherein the lightweight support structure comprising a honeycomb panel having at least one face skin made of a suitably rigid material, and in its pre-expanded condition said layer of intumescent material is in a range between approximately 6 mm and 10 mm thick, whereby, in use, the intumescent material supported on the panel expands when exposed to high temperatures to form a thick fire insulating barrier panel.

20. A method of manufacturing a self-supporting fire barrier panel, the method comprising the steps of:

providing a relatively thin layer of inorganic insulating material;

providing a lightweight support structure comprising a honeycomb panel having face skins made of a suitably rigid material; and adhering the lightweight support structure to a first side of said layer of inorganic insulating material so as to stiffen and support the insulating material into a rigid panel;

adhering an outer layer to a second opposite side of said layer of insulating material;

whereby, in use, the intumescent material supported on the panel can withstand high temperatures to form a fire insulating barrier panel.

21. A method of manufacturing a self-supporting fire barrier as defined in claim 20, wherein the insulating layer is an intumescent material which expands when exposed to high temperatures.

22. A method of manufacturing a self-supporting fire barrier as defined in claim 21, wherein a honeycomb panel is provided having a honeycomb core of non-combustible aluminum foil with face skins comprising plastics resin reinforced by glass fiber.

23. A method of manufacturing a self-supporting fire barrier as defined in claim 22, wherein said step of adhering the layer of intumescent material comprises curing the plastic resin in a press at an elevated temperature below the temperature at which the intumescent layer expands, while co-bonding to the aluminum honeycomb and intumescent material.

24. A method of manufacturing a self-supporting fire barrier as defined in claim 23, wherein heat is only applied to one side of the panel, opposite to that on which the intumescent layer is provided, as the heat is conducted to the plastics resin immediately adjacent the intumescent layer via the aluminum honeycomb.

* * * * *